(12) United States Patent
Miyahara et al.

(10) Patent No.: US 8,045,440 B2
(45) Date of Patent: Oct. 25, 2011

(54) OPTICAL DISK CLEANING DEVICE

(75) Inventors: Takakazu Miyahara, Minamisatsuma (JP); Terumasa Miyahara, Minamisatsuma (JP)

(73) Assignee: Elm Inc., Minamisatsuma-shi (JP)

( * ) Notice: Subject to any disclaimer, the term of this patent is extended or adjusted under 35 U.S.C. 154(b) by 534 days.

(21) Appl. No.: 12/223,404

(22) PCT Filed: Feb. 9, 2007

(86) PCT No.: PCT/JP2007/000077
§ 371 (c)(1),
(2), (4) Date: Jul. 30, 2008

(87) PCT Pub. No.: WO2007/091398
PCT Pub. Date: Aug. 16, 2007

(65) Prior Publication Data
US 2009/0052295 A1    Feb. 26, 2009

(30) Foreign Application Priority Data

Feb. 10, 2006    (JP) ................................. 2006-034366

(51) Int. Cl.
*G11B 3/58*    (2006.01)
(52) U.S. Cl. ......................................................... 369/72
(58) Field of Classification Search ...................... 369/72
See application file for complete search history.

(56) References Cited

U.S. PATENT DOCUMENTS

| 5,161,146 A | 11/1992 | Chaya et al. |
| 5,423,103 A | 6/1995 | Born |
| 5,467,332 A * | 11/1995 | Tsurushima .................... 369/72 |
| 5,488,596 A * | 1/1996 | Martin .............................. 369/71 |
| 5,524,313 A * | 6/1996 | Sato ................................. 15/88.3 |
| 5,938,510 A * | 8/1999 | Takahashi et al. ............. 451/290 |
| 6,594,848 B1 * | 7/2003 | Lee ................................... 15/102 |
| 2006/0026613 A1 * | 2/2006 | Mao et al. ...................... 720/655 |

FOREIGN PATENT DOCUMENTS

| EP | 0 640 969 A2 | 3/1995 |
| JP | 62-222478 A | 9/1987 |
| JP | U-62-161385 | 10/1987 |
| JP | A-03-049086 | 3/1991 |
| JP | A-05-101604 | 4/1993 |
| JP | A-08-180643 | 7/1993 |

(Continued)

OTHER PUBLICATIONS

Japanese Office Action issued in Application No. 2007-557765; Dated Aug. 3, 2010 (With Translation).

(Continued)

*Primary Examiner* — Mark Blouin
(74) *Attorney, Agent, or Firm* — Oliff & Berridge, PLC (57) ABSTRACT

An optical disk polishing device which includes: a disk holder for rotatably holding an optical disk, the disk holder installed in a lower fixed portion; a cylindrical buff disposed in parallel with the surface of the optical disk and perpendicular to a rotary shaft of the disk holder in an offset manner; a drive motor to rotate the buff; and an upper opening-and-closing portion normally urged to an open state to the lower fixed portion by a spring or other member. The device makes it possible to clean a readout surface of the optical disk in a short period of time, and to be offered at a low price owing to the simple and small-sized structure thereof.

41 Claims, 8 Drawing Sheets

FOREIGN PATENT DOCUMENTS

| | | |
|---|---|---|
| JP | U-05-095331 | 12/1993 |
| JP | A-06-119755 | 4/1994 |
| JP | A-10-162547 | 6/1998 |
| JP | A-11-090358 | 4/1999 |
| JP | A-11-151128 | 6/1999 |
| JP | 2000-243059 A | 9/2000 |
| JP | U-3073999 | 9/2000 |
| JP | A-2002-190180 | 7/2002 |
| WO | WO 2005/109423 A1 | 11/2005 |

OTHER PUBLICATIONS

Office Action mailed Apr. 12, 2011 in Japanese Patent Application No. 2007-557765, with English translation.

* cited by examiner

OPTICAL DISK CLEANING DEVICE

TECHNICAL FIELD

The present invention relates to an optical disk cleaning device for removing contamination including dust or fingerprints attached on the readout surface of an optical disk such as a compact disk (CD) or a digital versatile disk (DVD).

BACKGROUND ART

An optical disk such as a DVD is widely used as a medium in the rental video business. The adhesion of contamination such as dust or fingerprints on the readout surface deteriorates the appearance of the rented disks as well as causes readout problems deriving from the fundamental system of reading out stored information by the use of light. Therefore, frequent cleaning of optical disks is required at a video rental store or similar facility. However, there has been no conventional mechanical device for the aforementioned simple cleaning. Instead, a repairing device to remove scratches on the readout surface of a disk by polishing the disk is utilized, or a manual operation including spraying a cleansing liquid and then wiping the liquid with a cloth is carried out.

Patent Document 1 entitled "disk washing device" discloses a disk cleaning device for cleaning polished disks in a process of manufacturing a magnetic disk, an optical disk or other storage media. On the other hand, Patent Document 2 entitled "optical disk medium cleaning mechanism" discloses a cleaning mechanism for cleaning an optical disk medium by using a cleaning liquid. Further, Patent Document 3 entitled "washing device for optical disk and dust absorptive cloth" discloses a cleaning device which automatically cleanses the information recording surface of an optical disk, and a cartridge-type dust absorbing cloth used in the cleaning machine.

Patent Document 1: Japanese Unexamined Patent Application Publication No. H11-90358
Patent Document 2: Japanese Unexamined Patent Application Publication No. H5-101604
Patent Document 3: Japanese Unexamined Patent Application Publication No. H8-180643

DISCLOSURE OF THE INVENTION

Problem to be Solved by the Invention

The cleaning of returned disks is an important job in a rental video store, and there is a strong demand for a mechanical device which cleans disks in a short period of time especially during the busy hours of the day when the store is crowded with customers. Using a restoration device in place of a cleaning device is not recommendable. For example, a manual restoration device requires considerable labor and takes tens of seconds or more. Although a mechanical restoration device does not require much labor, such a device has problems including the expensive cost and abrasion of disks due to polishing the surface of the disks. In the case of cleaning by hand, two steps of operation, that is, a step of spraying a cleaning liquid and a step of wiping off the liquid are required, also taking tens of seconds. Further, there is a risk of scratching the disks caused by dust attached to the wiping cloth.

The device disclosed in Patent Document 1 is intended to be used in a process for producing media such as a magnetic disk and an optical disk, and has a large and complex body. Therefore, it is not suitable for the device to be used in the storefronts of video rental stores.

On the other hand, since the cleaning device disclosed in Patent Document 2 is intended for a disk housed in a cartridge, the device cannot be used for cleaning a bare disk such as a CD or DVD. Further, the pad used for cleaning does not make a rotational movement, and therefore, considerable time is needed for the cleaning.

Patent Document 3 discloses a washing device for an optical device and a cartridge-type dust absorptive cloth used for the device, and the device washes optical disks in two steps, that is, a step of washing with a brush and a step of wiping with the dust absorbing cloth. As a result, the device becomes large and complex, and also requires considerable time for washing. Therefore, this device is also not suitable for use in the storefronts of video rental stores.

To solve the previously mentioned problem, the present invention intends to provide an inexpensive optical disk cleaning device which has a simple structure and is capable of cleaning disks in a short period of time.

Means for Solving the Problems

The optical disk cleaning device according to the present invention is devised to solve the above problems, and is characterized by:

a) a disk holder for rotatably holding an optical disk to be cleaned at a lower fixed portion;

b) a cylindrical buff having a rotary shaft which is disposed in parallel with the surface of the optical disk and perpendicular to a rotary shaft of the disk holder in an offset manner;

c) a drive motor to rotate the buff; and d) an upper opening-and-closing portion normally urged to an open state to the lower fixed portion by an elastic member.

EFFECT OF THE INVENTION

Since the optical disk cleaning device according to the present invention has a simple structure, the device can be made small in size, and thus the price thereof can be lowered. Therefore, the optical disk cleaning device, which makes it possible to easily clean optical disks in a short period of time in the storefronts of rental stores such as video rental stores, is industrially very useful.

BRIEF DESCRIPTION OF THE DRAWINGS

FIGS. 3(A). 3(B) and 3(C) are a plain view, a front view and a side view, respectively, each illustrating a track roller which supports a disk holder.

EXPLANATION OF NUMERALS

10 . . . Lower Fixed Portion
11 . . . Optical Disk to Be Cleaned
12 . . . Bearing
13 . . . Disk Holder
14 . . . Disk Mat
15 . . . Track Roller Bearing
16 . . . Brake Pad
17 . . . Spring Plate
20 . . . Upper Opening-and-Closing Portion
21 . . . Buff
22 . . . Buff Bobbin
23 . . . Drive Motor
24 . . . Brake Releasing Projections
25 . . . Opening-and-Closing Member
26 . . . Spray Bottle
27 . . . Cleaning Liquid Tank
30 . . . Pump Body
31 . . . Cylinder-Side Link
32 . . . Suction Port
33 . . . Suction-Side Valve
34 . . . Discharging Port
35 . . . Discharging-Side Valve
36 . . . Cylinder
37 . . . Piston
38 . . . O-Ring
39 . . . Piston Rod
40 . . . Return Spring
41 . . . Piston-Side Link
42 . . . Suction Tube
43 . . . Discharging Tube
44 . . . Spray Nozzle
45 . . . Pin
46 . . . Pump Fixing Portion
47 . . . Pump Guiding Groove
50 . . . Tube
51a, 51b . . . Check Valve
52 . . . Valve Body
53 . . . Elastic Body
60 . . . Flow Velocity Reduction Portion

BEST MODE FOR CARRYING OUT THE INVENTION

The following description will discuss some examples of preferable embodiments of the aforementioned optical disk cleaning device.

First, the optical disk cleaning device is preferably provided with a driven wheel which supports the disk holder at a position opposite to the buff.

Next, the optical disk cleaning device is preferably provided with an automatic rotation mechanism which rotates the drive motor when the upper opening-and-closing portion is closed.

Further, the optical disk cleaning device may be provided with a brake mechanism which brakes the rotation of the disk holder when the upper opening-and-closing portion is opened.

Moreover, the optical disk cleaning device is preferably provided with a timer mechanism to reduce the rotation speed of the drive motor or stop the rotation of the drive motor after the lapse of a predetermined time.

Furthermore, the optical disk cleaning device is preferably provided with a cleaning liquid injection mechanism to inject or spray a cleaning liquid to the optical disk or the buff, when the upper opening-and-closing portion is closed. It is to be noted that "inject or spray" in this specification includes the injection of liquid, the spraying of mist, and some other modes such as the dropping of liquid and injection of foam.

In addition, the optical disk cleaning device is preferably provided with an end-of-cleaning notification device which detects the end of cleaning based on an increase in the electric current of the drive motor by a predetermined amount or more and/or based on a decrease in the rotation speed of the drive motor by a predetermined amount or more, and notifies the end of the cleaning to an operator.

Examples of the notification device include a visual display device such as a lamp, an acoustic display device such as a buzzer, and a tactile display device such as a vibrator, or any combination of two or more of these devices.

Alternatively, in a similar configuration, a motor control mechanism which substantially reduces the rotation speed of the drive motor or stops the drive motor may be installed.

It is also possible to include a motor-stopping mechanism which detects the opening of the upper opening-and-closing portion based on a decrease in the electric current of the drive motor by a predetermined amount or more and/or based on a increase in the rotation speed of the drive motor by a predetermined amount or more, and stops the rotation of the drive motor.

Further, it is preferable that a fixing mechanism to fix the upper opening-and-closing portion to the lower fixed portion when the upper opening-and-closing portion is closed, and a releasing mechanism to release the fixing mechanism to open the upper opening-and-closing portion when the end of cleaning is detected are installed.

The buff may be a buff consisting of a buff bobbin to be rotated by the drive motor and a buff material removably and unrotatably attached to the periphery of the buff bobbin.

Further, the buff may have a structure in which a plurality of layers of a disk-shaped buff cloth or buff plate are laminated in the axis direction of the buff bobbin which is to be rotated by the drive motor.

An applicable example of the cleaning liquid injection mechanism is a cleaning liquid injection mechanism having a pump consisting of an elastic tube and check valves installed at both sides of the tube, and a mechanism for pressing the tube in conjunction with the closing of the upper opening-and-closing portion.

The following description will discuss the operation principle of the optical disk cleaning device according to the present invention with reference to the Figures.

Figure 1:
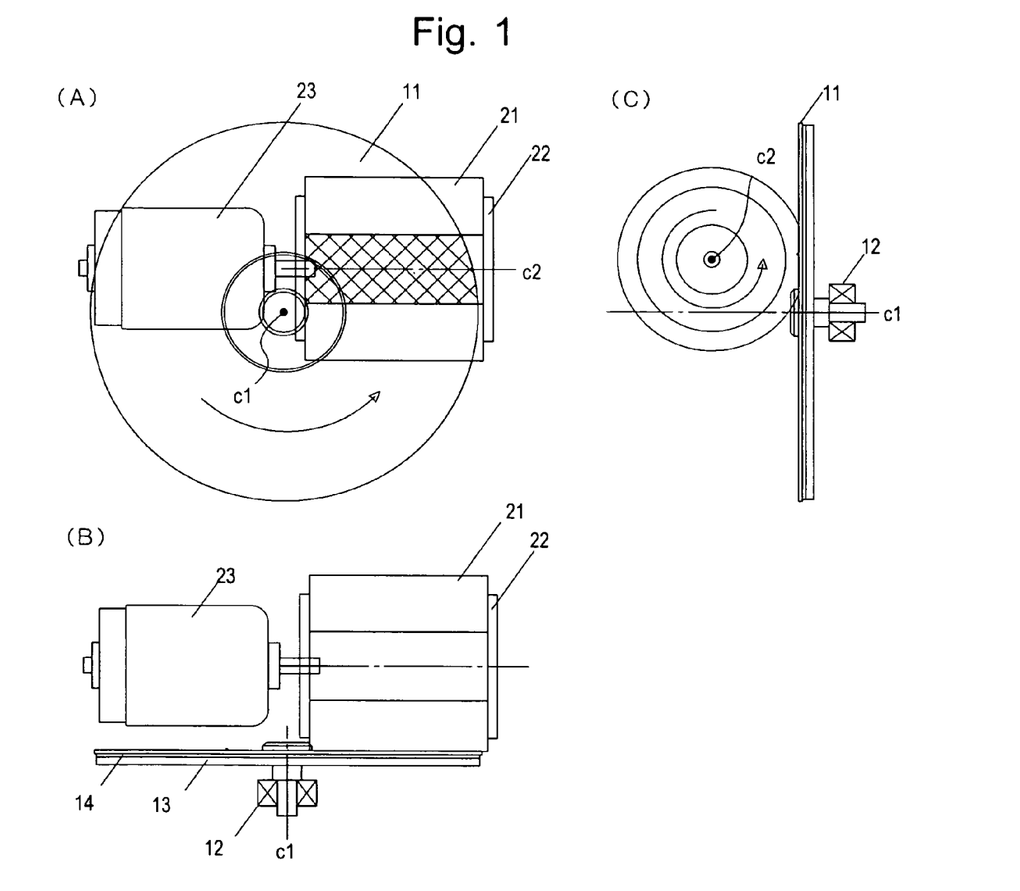
FIGS. 1(A), 1(B) and 1(C) are a plain view, a front view and a side view, respectively, each illustrating the principle of the optical disk cleaning device according to the present invention.

FIGS. 1(A), 1(B) and 1(C) illustrate views from three sides of one embodiment of the optical disk cleaning device according to the present invention. FIG. 1(A) is a plain view illustrating the basic part, FIG. 1(B) is the front view, and FIG. 1(C) is the side view.

A disk holder 13, which is held by a bearing such as a ball bearing 12 in a freely rotatable manner is illustrated in the lower part of the figure. A buff mechanism is illustrated in an upper part of the figure with the rotary shaft c2 thereof paralleling the surface of an optical disk 11, the buff mechanism being disposed perpendicular to a rotary shaft c1 of the disk holder 13 in an offset manner. The buff mechanism is formed of a spool-shaped buff bobbin 22 located at the center and a buff 21 (the aforementioned "buff material") made of a cylindrical flexible sponge or similar material provided at the periphery of the buff bobbin 22. The buff bobbin 22 is connected directly or through a gear or a belt, etc. to a drive motor 23, and the buff 21 is pressed to the optical disk 11 to be cleaned at an appropriate pressure. The cross-hatched region in FIG. 1(A) shows the contact portion between the buff 21 and the optical disk 11.

The buff 21 is detachable from the buff bobbin 22, and the used buff 21 is changed at an appropriate timing. Upon changing, the buff 21 should be prevented from rotating on the buff bobbin 22 so that the torque of the drive motor 23 can be assuredly transmitted to the buff 21 (and the optical disk 11). For example, the buff bobbin 22 may have a projection on the circumference thereof, or the buff bobbin 22 in a polygonal shape may be inserted into the center hole of the buff 21 having a diameter slightly smaller than that of the buff bobbin 22. The buff 21 may have a structure in which plural sheets of disk-shaped buff cloth (or buff plate) are laminated in the axis direction. The outer peripheral side and the inner side of the buff are consumed or contaminated at different levels. The aforementioned structure of the buff 21 makes it possible to change only a consumed (or dirty) portion of the buff cloth (plate).

When the drive motor 23 is rotated in the direction of the arrow shown in FIG. 1(C) with the buff 21 fixed on the buff bobbin 22, the frictional force generated between the buff 21 and the optical disk 11 drives the optical disk 11 together with the disk holder 13 to rotate in the direction of the arrow shown in FIG. 1(A).

Figure 2:
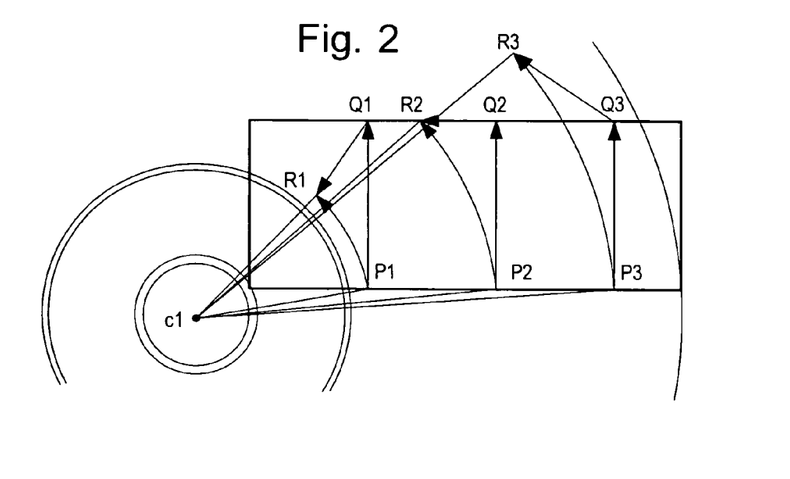
FIG. 2 is an enlarged view illustrating movements of the buff and the optical disk at the contact portion.

FIG. 2 is a drawing illustrating the dynamic relation between the optical disk 11 and the buff 21 at the contact portion between them (cross-hatched region in FIG. 1(A)). FIG. 2 shows two kinds of orbits of three points (P1, P2, P3) located on a straight line in parallel with the rotary shaft c2 of the buff 21, on the outer surface periphery of the disk 11. The first one is an orbit starting upon contact with the optical disk 11 and ending upon separation from the optical disk, and the second one is an orbit of the rotational movement of the optical disk 11. In FIG. 2, it is assumed that P2 is at the position where the sliding movement, which takes place between the buff 21 and the optical disk 11, is minimized.

In FIG. 2, the points (P1, P2, P3) on the buff 21 move to points (Q1, Q2, Q3), respectively, along with the rotation of the buff 21, while the points (P1, P2, P3) on the optical disk 11 are shifted to points (R1, R2, R3), respectively, by the rotation movement. As a result of these movements, the sliding movements of Q1-R1, Q2-R2 and Q3-R3 are generated between the optical disk 11 and the buff 21, and thereby the surface of the optical disk 11 can be wiped off by the buff 21 owing to the sliding movement.

Figure 3:
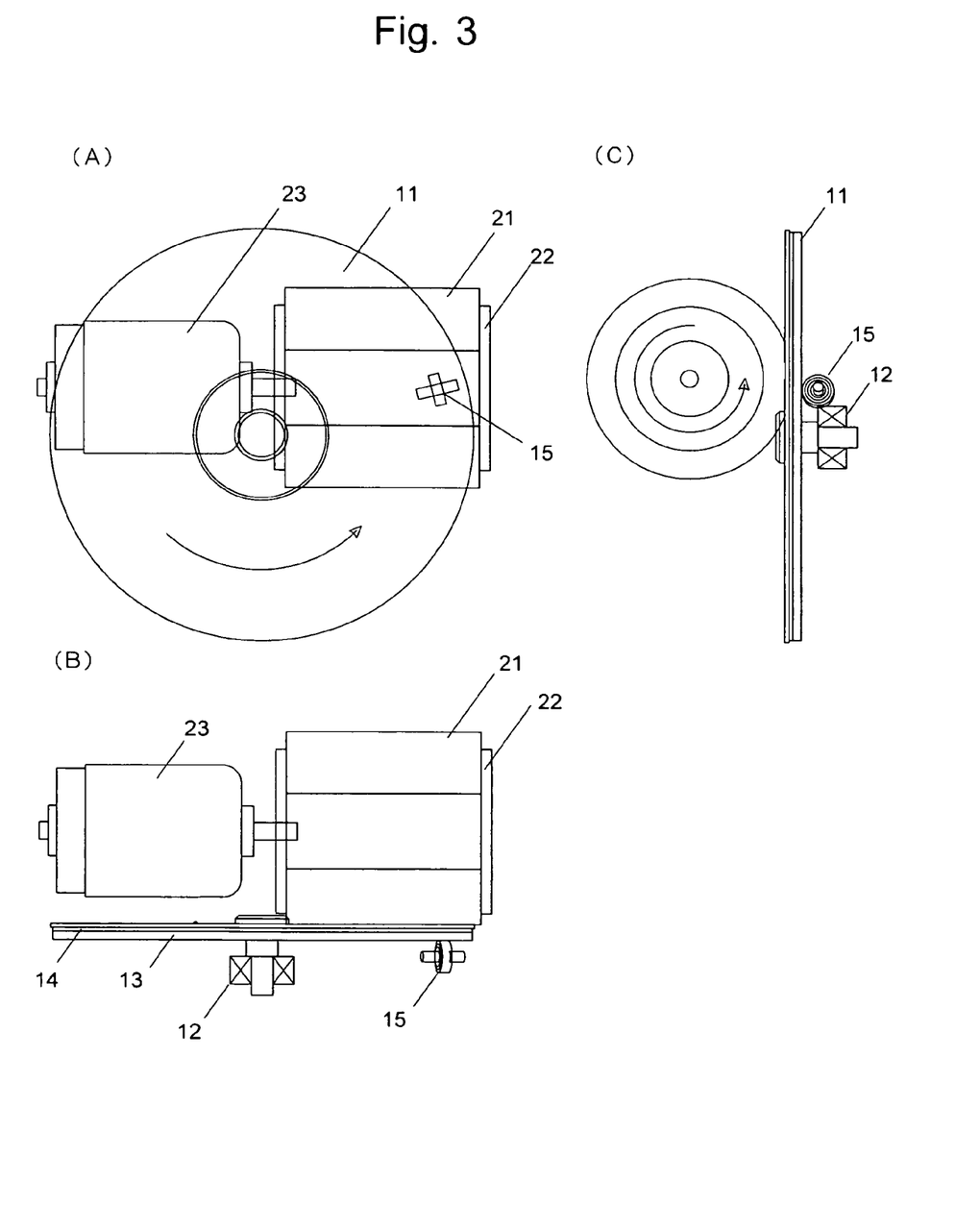

The disk holder 13 receives a pressing force applied by the buff 21 via the optical disk 11. For this reason, the shaft and a turntable portion of the disk holder 13 need to be made of a highly rigid material such as metals, or in the case of using a low rigid material such as resins, they need to be thick or have a rib structure. However, providing a track roller bearing 15 as shown in FIGS. 3(A), 3(B) and 3(C) enables the bearing, shaft, and/or turntable of the disk holder to be made of a flexible and light material such as resins. The bearing 15 is a driven wheel supported by, for example, a ball bearing at the center (force point) of the portion where the disk holder 13 receives the pressure applied by the buff 21.

EXAMPLES

Figure 4:
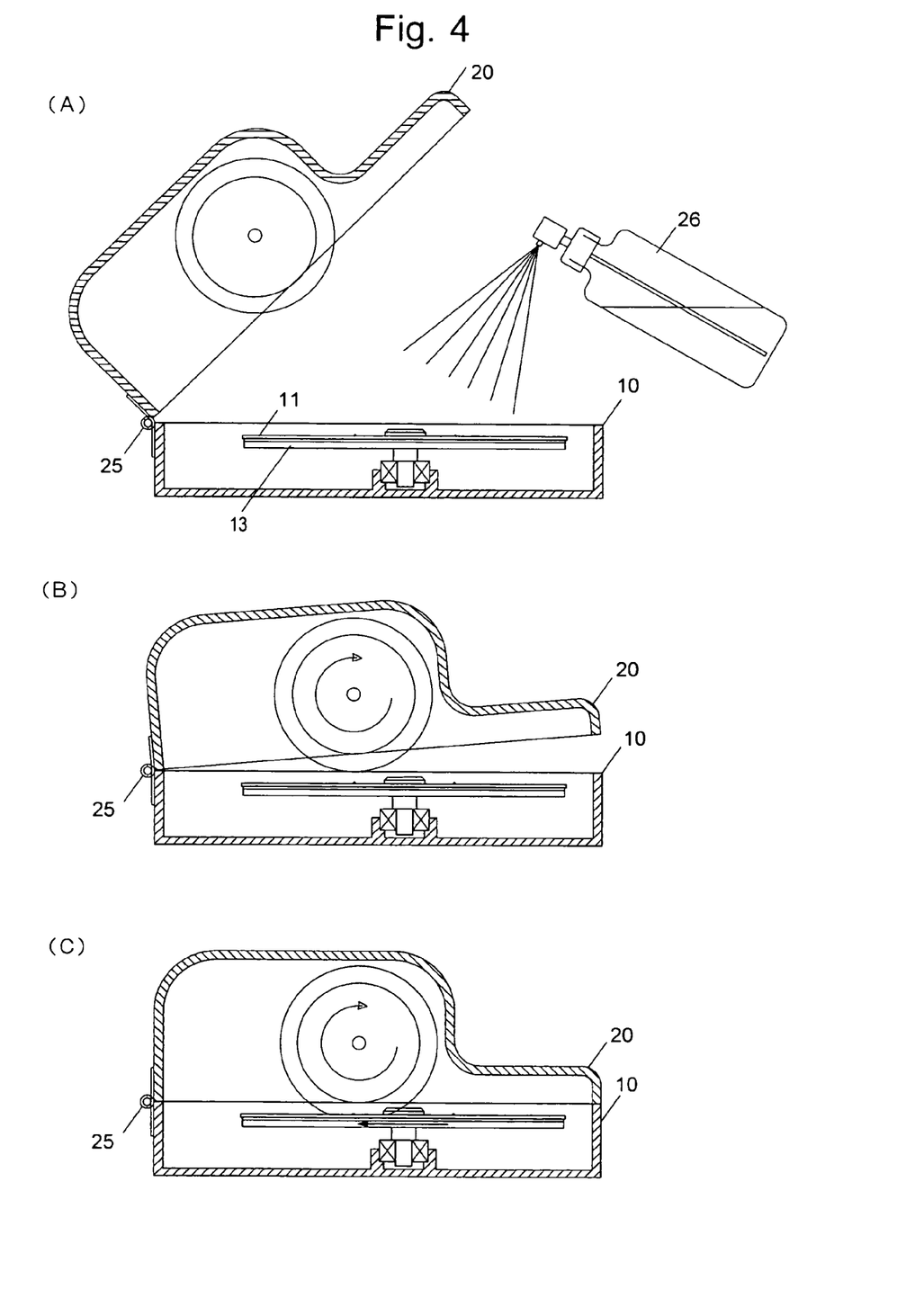
FIG. 4(A) is a side view of one embodiment of the present invention with the upper opening-and-closing portion opened at the preparatory stage of cleaning.
FIG. 4(B) shows the embodiment at the stage where the drive motor starts rotating when the opening-and-closing portion is closed.
FIG. 4(C) shows the embodiment with the upper opening-and-closing portion closed at the cleaning stage.

FIGS. 4(A), 4(B) and 4(C) show one of the specific embodiments of the optical disk cleaning device of the present invention. The optical disk cleaning device according to the embodiment is configured mainly by two parts. The first part is a lower fixed portion 10, which has the bearing 12 for rotatably holding the disk holder 13 and holds an upper opening-and-closing portion 20 by an opening-and-closing member 25 such as a sprung hinge. The second part is the upper opening-and-closing portion 20, which includes the cylindrical buff 21 for cleaning the disk 11, the buff bobbin 22 holding the buff 21, and the drive motor 23 (not shown) for driving to rotate the buff 21 via the buff bobbin 22. The upper opening-and-closing portion 20 is configured to be opened from the lower fixed portion 10 by the action of the sprung hinge or other spring mechanisms, up to an angle allowing the easy taking out and putting in of the optical disk 11 as shown in FIG. 4(A).

A practical cleaning operation is performed as follows: first, the optical disk 11 to be cleaned is mounted on the disk holder 13 with the upper opening-and-closing portion 20 opened, and then a cleaning liquid is sprayed over the disk 11 by utilizing a spray bottle 26 or a similar device as shown in FIG. 4(A). Subsequently, as shown in FIG. 4(B), upon manually closing the upper opening-and-closing portion 20, the drive motor 23 (not shown) starts rotating when the upper opening-and-closing portion 20 reaches a predetermined angle. As the upper opening-and-closing portion 20 is further closed, the buff 21 makes contact with the optical disk 11, which initiates rotation of the optical disk 11 due to the dynamic relation mentioned earlier, thereby cleaning begins.

The cleaning operation is completed in 3 to 5 seconds when an appropriate amount of a cleaning liquid having an appropriate composition is sprayed and at the same time a buff having a diameter of approximately 60 mm and a drive motor which rotates the buff at a rotation speed of approximately 3000 RPM are used. It is to be noted that, in the use of the optical disk cleaning device according to the embodiment, the operator is expected to press the upper opening-and-closing portion 20 downward during the cleaning of the optical disk 11. When the operator releases the pressing of the upper opening-and-closing portion 20 after cleaning, the upper opening-and-closing portion 20 is opened by the action of a spring or other equipment at the angle shown in FIG. 4(A). Thereafter, the optical disk 11 that has been cleaned is taken out, thereby completing a series of the operation.

Figure 5:
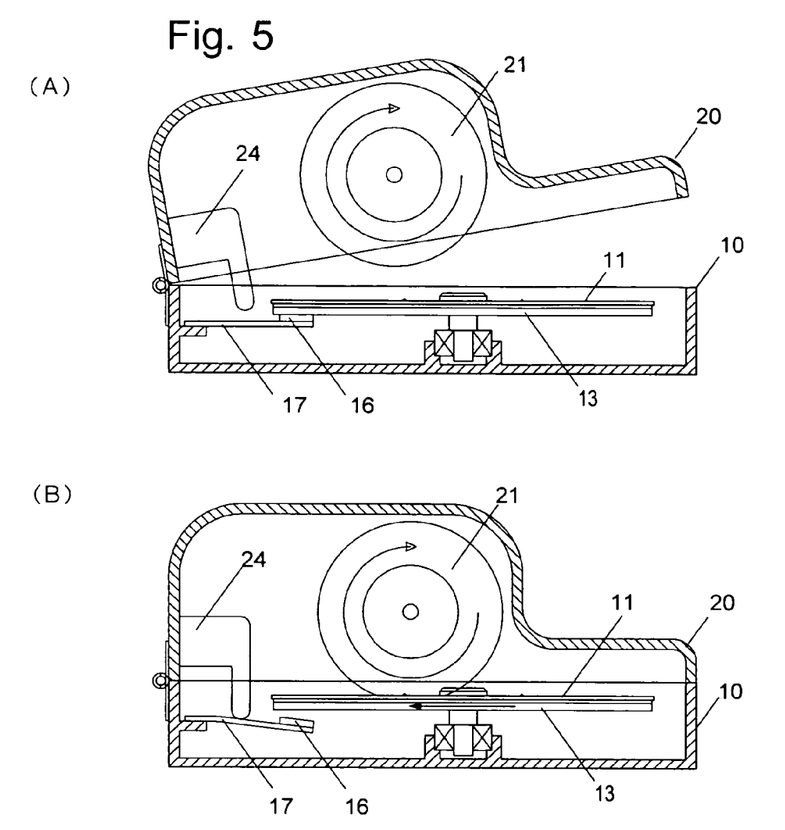
FIGS. 5(A) and 5(B) are explanatory side views of a brake mechanism, when the brake is engaged and when the brake is released, respectively.

FIGS. 5(A) and 5(B) are views illustrating an embodiment of the present invention having a brake mechanism against the rotation movement of the disk holder 13. The brake mechanism consisting of a brake pad 16 and a spring plate 17 is installed in the lower fixed portion 10. The spring plate 17 is formed of a resin or metal and has elasticity in the vertical direction thereof and rigidity in the rotational direction of the disk holder 13. The brake pad 16 is pressed to the lower surface of the disk holder 13 when the upper opening-and-closing portion 20 is opened. On the other hand, the upper opening-and-closing portion 20 is provided with a brake releasing projection 24, which presses the spring plate 17 downward to separate the brake pad 16 from the disk holder 13 as shown in FIG. 5(B) when the upper opening-and-closing portion 20 is closed. In other words, according to the optical disk cleaning device of the present embodiment, the disk holder 13 is able to rotate freely when the upper opening-and-closing portion 20 is closed, whereas the disk holder 13 makes contact with the brake pad 16 to immediately stop the rotation of the disk holder when the upper opening-and-closing portion 20 is opened. This structure enables easy removal of the optical disk 11 after completion of the cleaning.

Although, the above description shows the embodiment in which the spring plate functions as the spring mechanism of the brake, and the brake pad makes contact with the lower surface of the disk holder using the brake releasing projection in the upper opening-and-closing portion, it is possible to employ an optional braking method and an optional site to apply the brake including an electric sensor and a magnetic brake, and those factors do not have any influence on the effect of the present invention. For example, when a bearing provided with a waterproof or dustproof seal (bearing seal) made of an elastic material such as rubber is used as the bearing 12 for holding the disk holder 13, the sealing material can perform a function of the brake mechanism. In this case, when the buff is separated from the disk surface upon opening of the upper opening-and-closing portion 20, the rotation speed of the optical disk 11 is immediately reduced by the frictional resistance of the sealing material. The same effect can be achieved by disposing another mechanism that provides an appropriate frictional resistance between the inner ring and the outer ring of the bearing 12, or between the disk holder 13 and the lower fixed portion 10.

Figure 6:
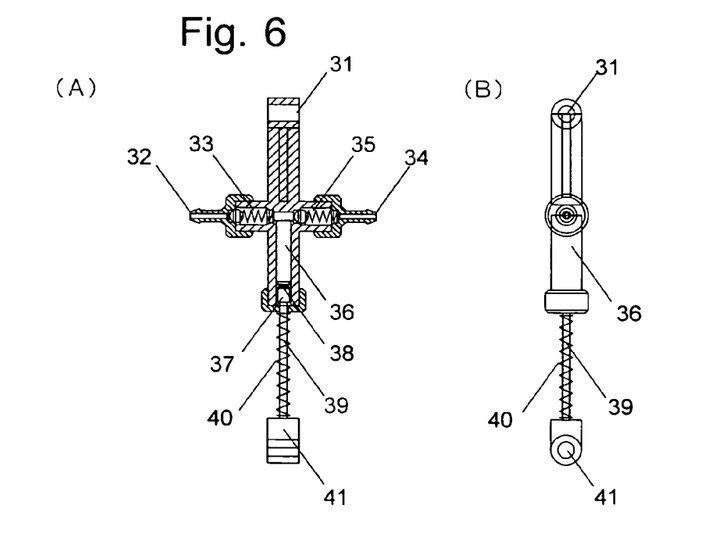
FIGS. 6(A) and 6(B) are a front cross-sectional view and a side view, respectively, illustrating one embodiment of a cleaning liquid supply pump.

FIGS. 6(A) and 6(B) show one example of the structure of the cleaning liquid supply pump which is driven by utilizing the force to close the upper opening-and-closing portion 20. The FIG. 6(A) is a cross-sectional view seen from the front, and the FIG. 6(B) is a side view.

The cleaning liquid supply pump consists of a main body 30 and a piston part. The main body 30 includes a suction-side valve 33 located on the side of a suction port 32, a discharging-side valve 35 located on the side of a discharging port 34, a cylinder 36, and a cylinder-side link 31. The piston part includes a piston 37 holding an O-ring 38 for sealing, a piston rod 39 for pushing or pulling the piston 37, a return spring 40 to push back the piston 37, and a piston-side link 41. By the push/pull motion of the piston, the pump suctions liquid or air from the suction port 32 or discharges it from the discharging port 34.

Figure 7:
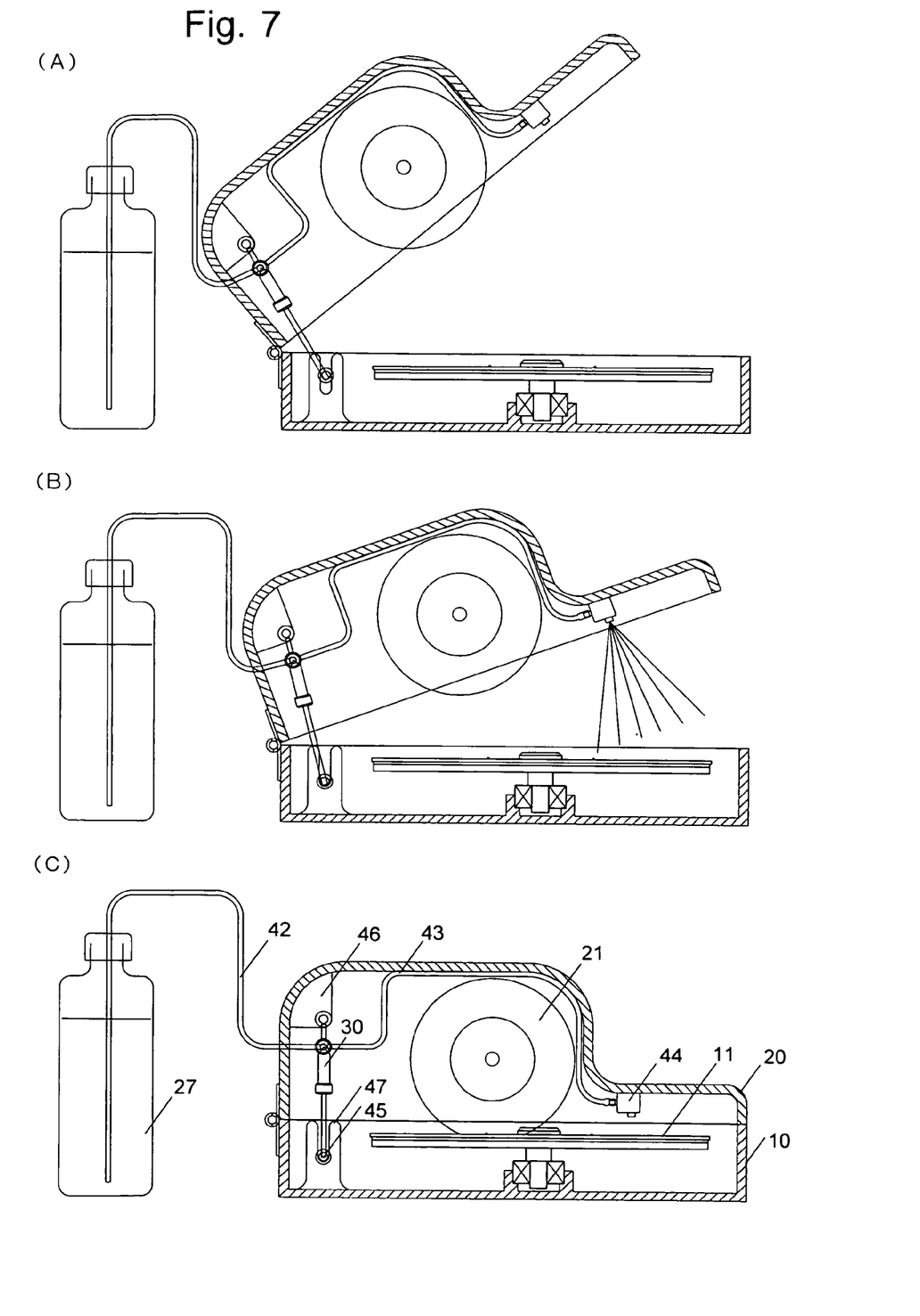
FIGS. 7(A), 7(B) and 7(C) are side views of another embodiment of the present invention in a state where the upper opening-and-closing portion is open, a state where cleaning liquid is sprayed by closing the upper opening-and-closing portion, and a cleaning process, respectively.

FIGS. 7(A), 7(B) and 7(C) show a first example of the optical disk cleaning device in which the above-mentioned cleaning liquid supply pump is utilized. The main body of the cleaning liquid supply pump is rotatably held, via the cylinder-side link 31, by a pump fixing portion 46 installed in the upper opening-and-closing portion 20, whereas the piston part is held in a smoothly slidable and rotatable manner, via a pin 45 inserted into the hole of the piston-side link 41, by a pump guiding groove 47 provided in the lower fixed portion 10.

A suction tube 42 is connected to the suction port 32 of the cleaning liquid supply pump, with another end of the tube connected to a cleaning liquid tank 27. A discharging tube 43 is connected to the discharging port 34 of the cleaning liquid supply pump, with another end of the tube connected to a spray nozzle 44.

FIG. 7(A) shows the upper opening-and-closing portion 20 in an open state, in which the piston of the cleaning liquid supply pump is located at the outer most side of the cylinder due to the action of the return spring 40 shown in FIGS. 6(A) and 6(B). Upon closing the upper opening-and-closing portion 20, the pin 45 inserted into the hole of the piston-side link 41 collides with the lower end of the pump guiding groove 47 provided in the lower fixed portion 10, and then the pin 45, being unable to further go down, starts pushing up the piston. As a result, a cleaning liquid is sprayed onto the optical disk 11 from the spray nozzle 44 which is connected via the discharging tube 43 to the discharging port 34 of the pump, until the upper opening-and-closing portion 20 is completely closed.

Figure 8:
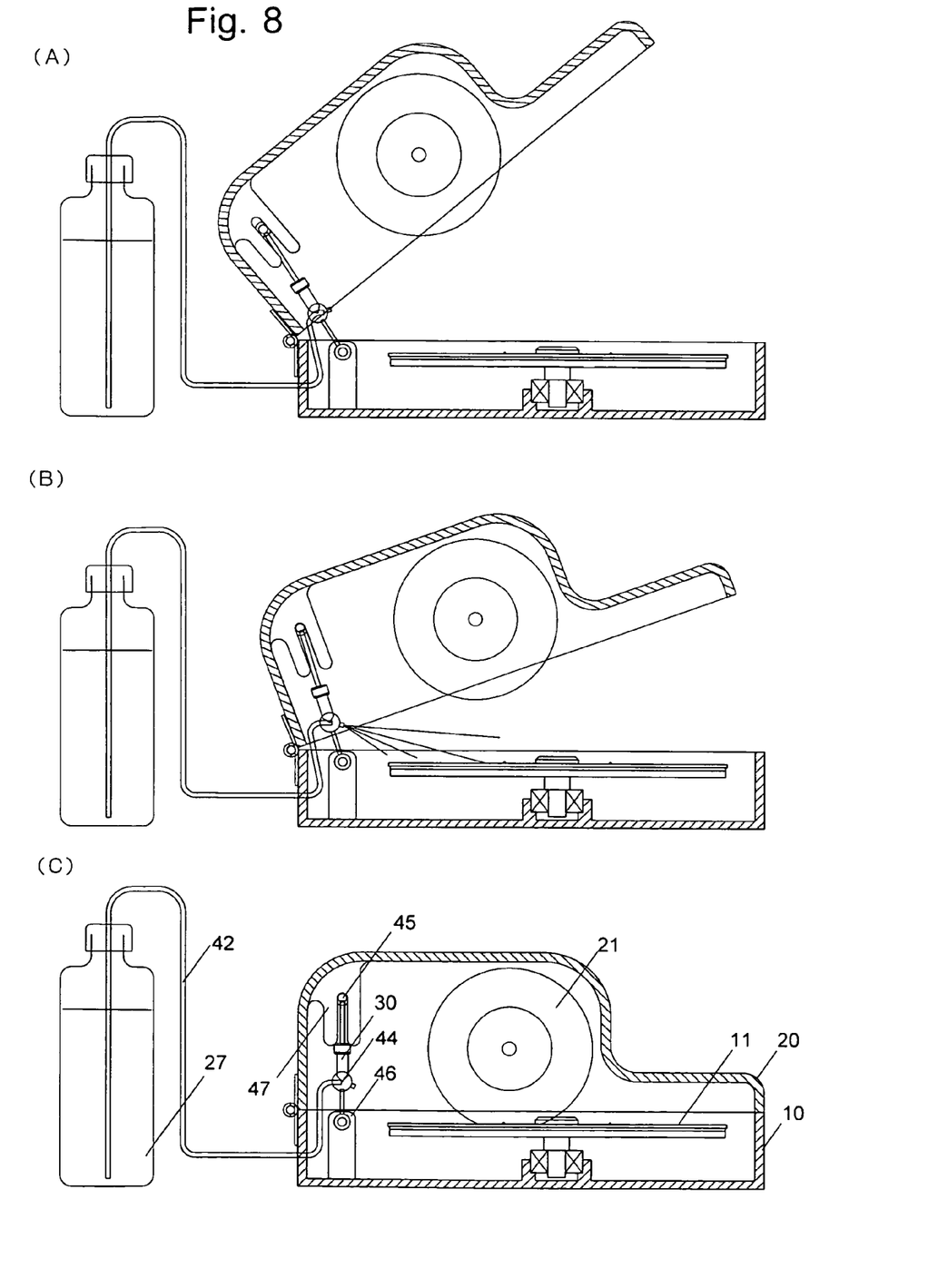
FIGS. 8(A), 8(B) and 8(C) are side views of another embodiment of the present invention in a state where the upper opening-and-closing portion is open, in a state where cleaning liquid is sprayed by closing the upper opening-and-closing portion, and in a cleaning process, respectively.

FIGS. 8(A), 8(B) and 8(C) show a second example of the optical disk cleaning device in which the above-mentioned cleaning liquid supply pump is utilized. The main body of the cleaning liquid supply pump is rotatably held, via the cylinder-side link 31, by the pump fixing portion 46 installed in the lower fixed portion 10, whereas the piston part is held in a smoothly slidable and rotatable manner, via the pin 45 inserted into the hole of the piston-side link 41, by the pump guiding groove 47 provided in the upper opening-and-closing portion 20.

The suction tube 42 is connected to the suction port 32 of the cleaning liquid supply pump, with another end of the tube connected to the cleaning liquid tank 27. The discharging tube 43 is directly connected to the spray nozzle 44.

FIG. 8(A) shows the upper opening-and-closing portion 20 in an open state, in which the piston of the cleaning liquid supply pump is located at the outer most side of the cylinder due to the action of the return spring 40 shown in FIGS. 6(A) and 6(B). Upon closing the upper opening-and-closing portion 20, the pin 45 inserted into the hole of the piston-side link 41 collides with the upper end of the pump guiding groove 47, and then the pin 45, being unable to further go up, starts pushing down the piston. As a result, the cleaning liquid is sprayed onto the optical disk 11 from the spray nozzle 44 which is connected to the discharging port 34 of the pump until the upper opening-and-closing portion 20 is completely closed.

It is to be noted that, although the example of FIGS. 8(A), 8(B) and 8(C) show the embodiment in which the spray nozzle 44 is directly connected to the discharging port 34 of the cleaning liquid supply pump, the spray nozzle can be connected to the discharging port via a tube in the same manner as shown in FIGS. 7(A), 7(B) and 7(C).

Figure 9:
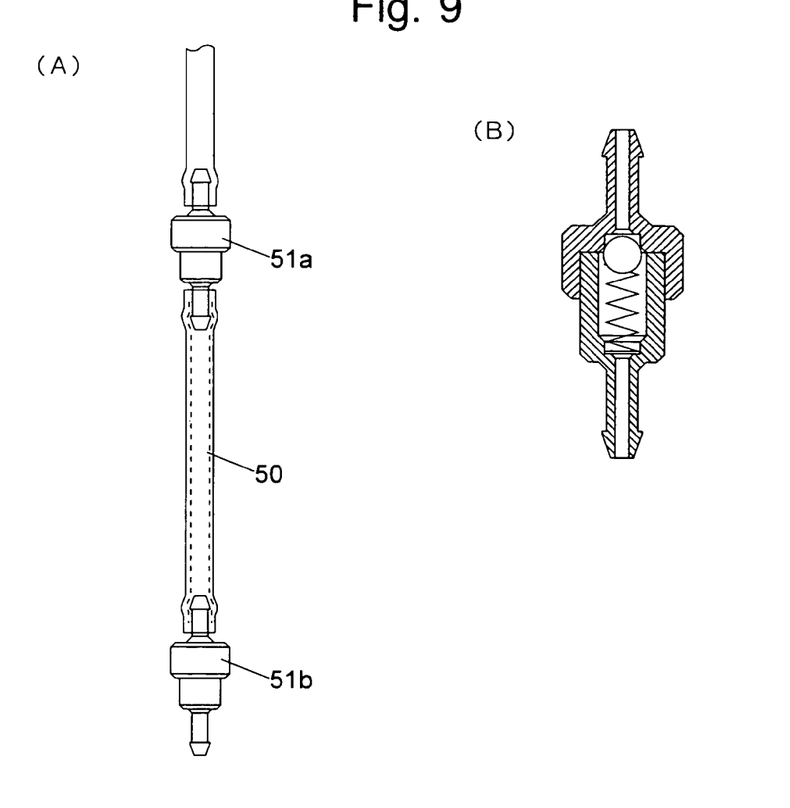
FIG. 9(A) is a front view of another embodiment of the cleaning liquid supply pump.
FIG. 9(B) is a cross-sectional view of a check valve used in the cleaning liquid supply pump.

FIGS. 9(A) and 9(B) show a pump having a simpler structure. A check valve 51a allowing an out-in flow and inhibiting the opposite flow is installed at one of the ends of an elastic tube 50, and a check valve 51b allowing an in-out flow and inhibiting the opposite flow is installed at the other end. The end of the tube 50 via the check valve 51a is connected to the cleaning liquid tank, and the opposite end of the tube via the check valve 51b is connected to the spray nozzle. This tube device is intended to be coupled with a mechanism which is actuated by a closing action of the upper opening-and-closing portion and forcibly squeezes the tube 50 between the two sides. When the upper opening-and-closing portion is closed, the check valve 51a is closed and the check valve 51b is opened, and thereby the cleaning liquid is injected or sprayed from the spray nozzle. When the upper opening-and-closing portion is opened, the tube 50 returns to the original state due to the elasticity, and thereby the cleaning liquid is suctioned from the tank into the tube 50 through the check valve 51a.

As mentioned earlier, in the optical disk cleaning device provided with the cleaning liquid supply pump of a kind as shown in FIGS. 6(A) and 6(B) or FIGS. 9(A) and 9(B), the cleaning liquid is discharged from the pump or suctioned into the pump in accordance with the opening or closing of the upper opening-and-closing portion. However, a large inflow velocity in the suction of the cleaning liquid may cause a slight discharge of the cleaning liquid from the spray nozzle 44, possibly resulting in attachment of the liquid to the optical disk which has been cleaned. This is caused by a tendency of the cleaning liquid to continue to flow, owing to the inertia of the liquid, even after the liquid fills the cylinder 36 or the tube 50 up to the maximum volume. When this situation occurs, the inflow velocity of the cleaning liquid needs to be reduced.

Figure 10:
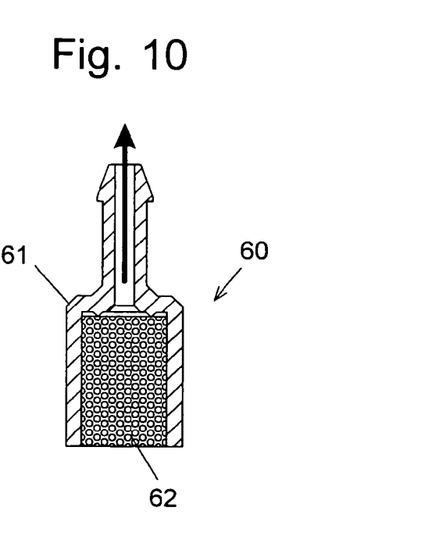
FIG. 10 is a cross-sectional view showing one embodiment of a flow velocity reduction portion.

FIG. 10 shows one example of a mechanism for reducing the inflow velocity of the cleaning liquid. The mechanism consists of a cup-shaped case 61 made of a resin and or other materials, and a sponge 62 made of an open-cell foam resin or a textile product such as felt that is filled in the case 61 (hereinafter referred to as flow velocity reduction portion 60). The mechanism is intended to be installed at the end of the suction tube 42 to be introduced into the cleaning liquid tank 27. The cleaning liquid suctioned by the cleaning liquid supply pump has its flow velocity reduced by the flow resistance applied upon flowing through the flow velocity reduction portion 60. It is to be noted that a flow velocity reduction portion of this kind can be disposed at any position as long as the position is located upstream of the suction-side check valve 51a or 33 in the pump, namely between the tip of the suction tube 42 to the suction port of the suction-side check valve.

Figure 11:
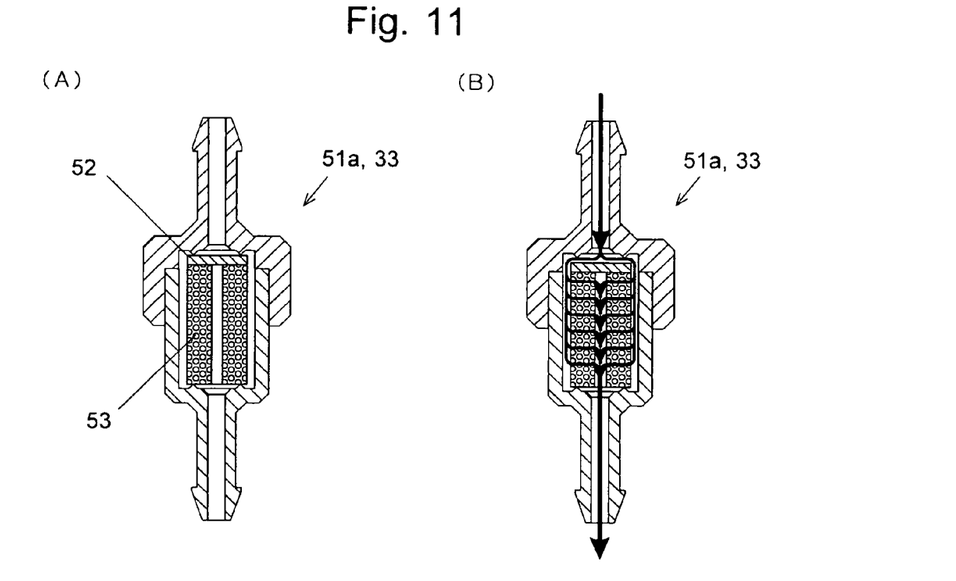
FIG. 11(A) is a cross-sectional view of another embodiment of the check valve used in the cleaning liquid supply pump.
FIG. 11(B) is a conceptual diagram showing a distribution channel of the cleaning liquid in the check valve.

Alternatively, it is possible to make the suction-side check valve 51a or 33 of the cleaning liquid supply pump have a similar function as the above-mentioned flow velocity reduction portion. A structure of a check valve of this kind is shown in FIG. 11(A). The structure is obtainable by forming the check valve 51a or 33 using a plate-like (disk-shaped) valve body 52 made of a flexible silicon rubber or a similar material and an elastic body 53 made of an open-cell foam resin. The elastic body 53 has a function of closing the check valve by biasing the valve 52, and also has a function to apply the flow resistance to the cleaning liquid by forcing the cleaning liquid flown into the check valve to flow through the continuous cells of the open-cell resin as shown in FIG. 11(B), thereby reducing the flow velocity. Since the check valve of this kind can be produced at a lower cost as compared with a check valve using a ball-shaped valve body and a coil spring as shown in FIG. 9(B), it is possible to reduce component costs as well as to reduce the flow velocity.

Some examples of the mechanism of the cleaning liquid supply pump have been described in the above. In addition to those examples, other various pumps such as a tube pump, a gear pump, and an electromagnetic pump are applicable. With regard to the drive of the mechanism, application of the force to close the upper opening-and-closing portion 20 is exemplified in the previous two examples. In addition to those examples, electrical driving including detection of the opening degree of the upper opening-and-closing portion 20 by an electrical switch may also be employed. Use of any of the methods mentioned earlier does not impact the effect of the present invention.

Moreover, in order to facilitate the explanation in the above, the opening and closing of the upper opening-and-closing portion 20 has been described as a rotary movement with the opening-and-closing member 25 set as a center. However, an optional method such as a sliding system using a link mechanism and a sliding system using a shaft and a bearing may be employed.

Furthermore, although the rotary shaft of the buff 21 is disposed in parallel with the opening-and-closing axis of the upper opening-and-closing portion 20 in the previous description the disposition angle may be any angle such as perpendicular, and the angle does not have any influence on the gist of the present invention.

The following description discusses the end of the cleaning operation. Unnecessarily continuing the cleaning operation of the optical disk lowers the efficiency of the operation, and further causes some problems including a shorter service life of the buff and occurrence of scratches on the surface of the disk derived from running the buff with a strong frictional coefficient.

On the other hand, termination of the cleaning operation before completion of the cleaning may cause some problems including the incomplete wiping of contamination and stains resulting from moisture of the sprayed cleaning liquid.

In light of the above, the disk cleaning operation is desirably stopped at a timing when the cleaning liquid between the optical disk and the buff has just been completed. The timing is determined depending on the following elements. A first element is a fixed element such as the rotation speed of the buff, offset amount between the rotation center of the disk and the rotation center of the buff, pressure between the buff and the optical disk to be cleaned, material of the buff, and composition of the cleaning liquid. A second element that changes the timing is a variable element such as the spraying amount of the cleaning liquid, degree of moisture or contamination of the buff as a result of the previous operation, or change in durability of the buff. Further, the timing is also influenced by temperature and humidity.

The operator who is used to using the device to some extent can notice the finishing of the cleaning liquid between the optical disk and the buff from the sound or sense of touch on the upper opening-and-closing portion 20. Therefore, the simplest configuration of the device of the present invention is such that no automatic ending mechanism is installed, and the drive motor can be stopped/rotated in conjunction with the opening and closing of the upper opening-and-closing portion 20 manipulated by the operator. In this case, the drive motor is preferably stopped after the entire body of the buff is separated from the optical disk when the upper opening-and-closing portion 20 is slightly opened. This is because, if the drive motor is stopped in a state where the buff is still in contact with the optical disk, a trace of the buff may be left on the optical disk.

Moreover, it is desirable that the device have a timer to set the timing to stop the drive motor so as to prevent the buff from continually rotating for a long period of time with the upper opening-and-closing portion closed, due to some sort of malfunction of the mechanism or a mistake by the operator.

In a case of a high performance device, a mechanism to automatically detect the timing when the cleaning liquid between the optical disk and the buff is consumed may be installed in the device. The following description will discuss the mechanism therefor.

Figure 12:
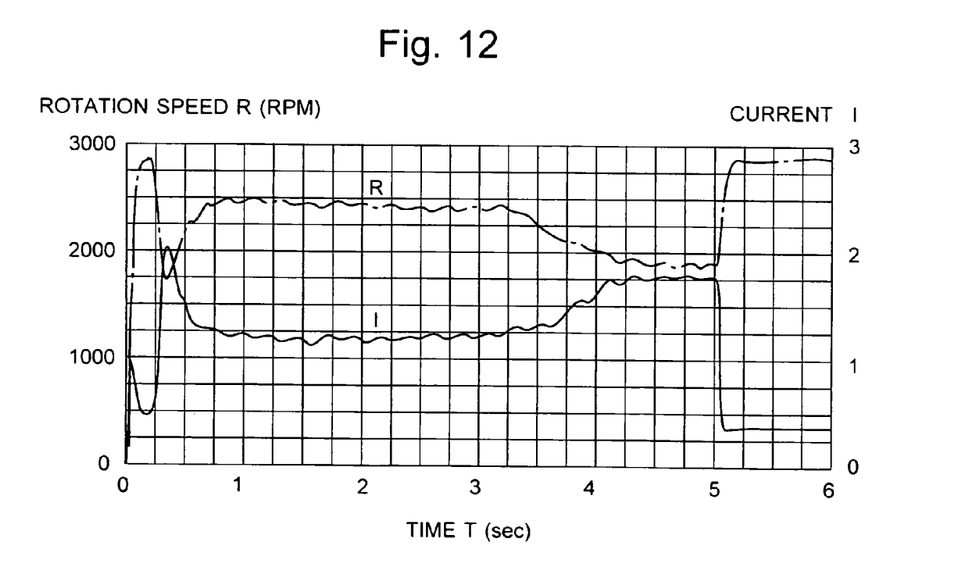
FIG. 12 is a graph showing changes in the electric current and the rotation speed of the buff drive motor in the disk cleaning device according to the embodiment.

FIG. 12 shows a result of time-series measurement of changes in the rotation speed and the electric current of the drive motor during the cleaning operation. When the upper opening-and-closing portion 20 is manually closed after the cleaning liquid is sprayed on the optical disk 11 that is mounted on the disk holder 13, the drive motor 23 is supplied with electric power before the upper opening-and-closing portion 20 is completely closed and starts rotating without any loading at the beginning. As the upper opening-and-closing portion 20 is further closed, the buff 21 makes contact with the optical disk 11 in a stopped state. The friction between the buff and the optical disk 11 temporarily causes a significant reduction of the rotation speed R of the drive motor 23, thereby increasing the electric current I. Thereafter, when the rotation speed of the optical disk 11 and the disk holder 13 holding the disk are increased, the rotation speed R and the electric current I are stabilized within a certain range. Next, when the sprayed cleaning liquid is wiped off by the buff 21, and is further dried due to dispersion caused by the centrifugal force generated by the high-speed rotation of the buff 21 and the optical disk 11, or due to evaporation as a result of heat generation by the friction between the buff 21 and the optical disk 11, the lubrication action of the cleaning liquid between the buff 21 and the optical disk 11 is lost, increasing the frictional coefficient, with the result that the rotation speed R is reduced and the electric current I is increased. When the upper opening-and-closing portion 20 is opened by the action of the spring mechanism after the operator stops pressing it, the buff 21 is separated from the optical disk 11. As a result, the rotation speed R is suddenly increased and the electric current I is lowered.

Therefore, by monitoring the rotation speed R of the drive motor 23 or the electric current I, or both of the rotation number R and the electric current I to detect the end of the cleaning, it is possible to perform the operation in a proper operation time without any excess or shortage in accordance with the change in the cleaning period of time caused by the fixed or variable elements mentioned earlier. Further, since the skill of the operator does not have any influence on the cleaning result, it is possible to achieve a highly reliable, efficient operation.

Accordingly, the operation can be completed in such a manner that the end of the operation is detected based on a decrease in the rotation speed R of the drive motor 23 by a predetermined amount or more or an increase in the electric current I by a predetermined amount or more, or based on both of the two factors, and then the drive motor is stopped.

Stopping while the buff is still in contact with the optical disk is not desirable, because this may leave a trace of the buff at the contacting site on the disk. Therefore, after detection of the end of the cleaning as mentioned earlier, it is desirable that the end of the cleaning be notified to the operator by a visual, audio, or tactile means, and subsequently the operator opens the upper opening-and-closing portion while the buff and the disk are still rotating, and then the drive motor is stopped after the buff is separated from the optical disk.

The upper opening-and-closing portion 20 may have a locking mechanism so that, when the operator closes the upper opening-and-closing portion 20, the closed state of the upper opening-and-closing portion 20 can be kept by the locking mechanism. Thereafter, when the detection mechanism mentioned earlier detects the end of the cleaning, the locking mechanism is released to automatically open the upper opening-and-closing portion 20.

According to a more preferable embodiment, when the end of the cleaning is detected by a mechanism similar to the above mechanism (or after passage of a prescribed time from the beginning of cleaning), the rotation speed of the drive motor 23 is largely reduced, and subsequently the motor 23 is completely stopped when the buff is separated from the optical disk upon opening the upper opening-and-closing portion 20. This embodiment makes it possible to suppress consumption of the buff resulting from high-speed running in a state where the lubrication action of the cleaning liquid has been lost and prevent occurrence of scratches on the disk surface, as well as prevent a trace of the buff from remaining on the disk. In this embodiment, the upper opening-and-closing portion 20 may be arranged to open automatically or to be manually opened by the operator. In the latter case, a mechanism to notify the end of cleaning to the operator may be separately provided. However, even without the notification mechanism, the operator can recognize the end of the cleaning operation based on a change in sound or vibration that accompanies the reduction in the rotation speed of the drive motor 23.

The invention claimed is:

1. An optical disk cleaning device comprising:
   a disk holder for rotatably holding an optical disk to be cleaned at a lower fixed portion;
   a cylindrical buff having a rotary shaft which is disposed in parallel with a surface of the optical disk and perpendicular to a rotary shaft of the disk holder in an offset manner;
   a drive motor to rotate the buff;
   an upper opening-and-closing portion normally urged to an open state to the lower fixed portion by an elastic member; and
   an end-of-cleaning notification device which detects an end of cleaning based on an increase in an electric current of the drive motor by a predetermined amount or more or based on a decrease in a rotation speed of the drive motor by a predetermined amount or more, and notifies the end of the cleaning to an operator.

2. The optical disk cleaning device according to claim 1, further comprising a driven wheel which supports the disk holder at a position opposite to the buff.

3. The optical disk cleaning device according to claim 1, further comprising an automatic rotation mechanism to rotate the drive motor when the upper opening-and-closing portion is closed.

4. The optical disk cleaning device according to claim 1, further comprising a brake mechanism which brakes a rotation of the disk holder when the upper opening-and-closing portion is opened.

5. The optical disk cleaning device according to claim 1, further comprising a timer mechanism to reduce a rotation speed of the drive motor or stop a rotation of the drive motor after a lapse of a predetermined period of time.

6. The optical disk cleaning device according to claim 1, further comprising:
   a fixing mechanism to fix the upper opening-and-closing portion to the lower fixed portion when the upper opening-and-closing portion is closed; and
   a releasing mechanism to release the fixing mechanism to open the upper opening-and-closing portion when an end of cleaning is detected.

7. The optical disk cleaning device according to claim 1, wherein the buff comprises a buff bobbin to be rotated by the drive motor and a buff material removably and unrotatably attached to a periphery of the buff bobbin.

8. The optical disk cleaning device according to claim 1, wherein the buff comprises a plurality of layers of a disk-shaped buff cloth or buff plate laminated in an axis direction of a buff bobbin which is rotated by the drive motor.

9. An optical disk cleaning device comprising:
a disk holder for rotatably holding an optical disk to be cleaned at a lower fixed portion;
a cylindrical buff having a rotary shaft which is disposed in parallel with a surface of the optical disk and perpendicular to a rotary shaft of the disk holder in an offset manner;
a drive motor to rotate the buff;
an upper opening-and-closing portion normally urged to an open state to the lower fixed portion by an elastic member; and
a motor control mechanism which detects an end of cleaning based on an increase in an electric current of the drive motor by a predetermined amount or more or based on a decrease in a rotation speed of the drive motor by a predetermined amount or more, and reduces the rotation speed of the drive motor or stops the drive motor.

10. The optical disk cleaning device according to claim 9, further comprising:
a fixing mechanism to fix the upper opening-and-closing portion to the lower fixed portion when the upper opening-and-closing portion is closed; and
a releasing mechanism to release the fixing mechanism to open the upper opening-and-closing portion when an end of cleaning is detected.

11. The optical disk cleaning device according to claim 9, further comprising a driven wheel which supports the disk holder at a position opposite to the buff.

12. The optical disk cleaning device according to claim 9, further comprising an automatic rotation mechanism to rotate the drive motor when the upper opening-and-closing portion is closed.

13. The optical disk cleaning device according to claim 9, further comprising a brake mechanism which brakes a rotation of the disk holder when the upper opening-and-closing portion is opened.

14. The optical disk cleaning device according to claim 9, further comprising a timer mechanism to reduce a rotation speed of the drive motor or stop a rotation of the drive motor after a lapse of a predetermined period of time.

15. The optical disk cleaning device according to claim 9, wherein the buff comprises a buff bobbin to be rotated by the drive motor and a buff material removably and unrotatably attached to a periphery of the buff bobbin.

16. The optical disk cleaning device according to claim 9, wherein the buff comprises a plurality of layers of a disk-shaped buff cloth or buff plate laminated in an axis direction of a buff bobbin which is rotated by the drive motor.

17. An optical disk cleaning device comprising:
a disk holder for rotatably holding an optical disk to be cleaned at a lower fixed portion;
a cylindrical buff having a rotary shaft which is disposed in parallel with a surface of the optical disk and perpendicular to a rotary shaft of the disk holder in an offset manner;
a drive motor to rotate the buff;
an upper opening-and-closing portion normally urged to an open state to the lower fixed portion by an elastic member; and
a motor-stopping mechanism which detects opening of the upper opening-and-closing portion based on a decrease in an electric current of the drive motor by a predetermined amount or more or based on an increase in a rotation speed of the drive motor by a predetermined amount or more, and stops a rotation of the drive motor.

18. The optical disk cleaning device according to claim 17, further comprising a driven wheel which supports the disk holder at a position opposite to the buff.

19. The optical disk cleaning device according to claim 17, further comprising an automatic rotation mechanism to rotate the drive motor when the upper opening-and-closing portion is closed.

20. The optical disk cleaning device according to claim 17, further comprising a brake mechanism which brakes a rotation of the disk holder when the upper opening-and-closing portion is opened.

21. The optical disk cleaning device according to claim 17, further comprising a timer mechanism to reduce a rotation speed of the drive motor or stop a rotation of the drive motor after a lapse of a predetermined period of time.

22. The optical disk cleaning device according to claim 17, wherein the buff comprises a buff bobbin to be rotated by the drive motor and a buff material removably and unrotatably attached to a periphery of the buff bobbin.

23. The optical disk cleaning device according to claim 17, wherein the buff comprises a plurality of layers of a disk-shaped buff cloth or buff plate laminated in an axis direction of a buff bobbin which is rotated by the drive motor.

24. An optical disk cleaning device comprising:
a disk holder for rotatably holding an optical disk to be cleaned at a lower fixed portion;
a cylindrical buff having a rotary shaft which is disposed in parallel with a surface of the optical disk and perpendicular to a rotary shaft of the disk holder in an offset manner;
a drive motor to rotate the buff;
an upper opening-and-closing portion normally urged to an open state to the lower fixed portion by an elastic member; and
a cleaning liquid injection mechanism to inject or spray a cleaning liquid onto the optical disk or the buff, when the upper opening-and-closing portion is closed, the cleaning liquid injection mechanism comprising a pump provided with a pump chamber, a volume of which changes in conjunction with opening or closing of the upper opening-and-closing portion, and check valves installed at a suction side and a discharging side of the pump chamber.

25. The optical disk cleaning device according to claim 24, wherein at least the check valve at the suction side comprises a plate-shaped valve body and an elastic member made of an open-cell foam resin for biasing the valve body.

26. The optical disk cleaning device according to claim 24, wherein a flow rate reduction mechanism for reducing a suction speed of the cleaning liquid by an effect of flow resistance is located upstream of the check valve installed at the suction side of the pump.

27. The optical disk cleaning device according to claim 24, further comprising a driven wheel which supports the disk holder at a position opposite to the buff.

28. The optical disk cleaning device according to claim 24, further comprising an automatic rotation mechanism to rotate the drive motor when the upper opening-and-closing portion is closed.

29. The optical disk cleaning device according to claim 24, further comprising a brake mechanism which brakes a rotation of the disk holder when the upper opening-and-closing portion is opened.

30. The optical disk cleaning device according to claim 24, further comprising a timer mechanism to reduce a rotation speed of the drive motor or stop a rotation of the drive motor after a lapse of a predetermined period of time.

31. The optical disk cleaning device according to claim 24, wherein the buff comprises a buff bobbin to be rotated by the drive motor and a buff material removably and unrotatably attached to a periphery of the buff bobbin.

32. The optical disk cleaning device according to claim 24, wherein the buff comprises a plurality of layers of a disk-shaped buff cloth or buff plate laminated in an axis direction of a buff bobbin which is rotated by the drive motor.

33. An optical disk cleaning device comprising:
a disk holder for rotatably holding an optical disk to be cleaned at a lower fixed portion;
a cylindrical buff having a rotary shaft which is disposed in parallel with a surface of the optical disk and perpendicular to a rotary shaft of the disk holder in an offset manner;
a drive motor to rotate the buff;
an upper opening-and-closing portion normally urged to an open state to the lower fixed portion by an elastic member; and
a cleaning liquid injection mechanism to inject or spray a cleaning liquid onto the optical disk or the buff, when the upper opening-and-closing portion is closed, the cleaning liquid injection mechanism comprising a pump provided with an elastic tube and check valves installed at both sides of the tube, and a mechanism for pressing the tube in conjunction with closing of the upper opening-and-closing portion.

34. The optical disk cleaning device according to claim 33, wherein at least the check valve at a suction side comprises a plate-shaped valve body and an elastic member made of an open-cell foam resin for biasing the valve body.

35. The optical disk cleaning device according to claim 33, wherein a flow rate reduction mechanism for reducing a suction speed of the cleaning liquid by an effect of flow resistance is located upstream of the check valve installed at a suction side of the pump.

36. The optical disk cleaning device according to claim 33, further comprising a driven wheel which supports the disk holder at a position opposite to the buff.

37. The optical disk cleaning device according to claim 33, further comprising an automatic rotation mechanism to rotate the drive motor when the upper opening-and-closing portion is closed.

38. The optical disk cleaning device according to claim 33, further comprising a brake mechanism which brakes a rotation of the disk holder when the upper opening-and-closing portion is opened.

39. The optical disk cleaning device according to claim 33, further comprising a timer mechanism to reduce a rotation speed of the drive motor or stop a rotation of the drive motor after a lapse of a predetermined period of time.

40. The optical disk cleaning device according to claim 33, wherein the buff comprises a buff bobbin to be rotated by the drive motor and a buff material removably and unrotatably attached to a periphery of the buff bobbin.

41. The optical disk cleaning device according to claim 33, wherein the buff comprises a plurality of layers of a disk-shaped buff cloth or buff plate laminated in an axis direction of a buff bobbin which is rotated by the drive motor.

* * * * *